US012806782B2

(12) United States Patent
Falco et al.

(10) Patent No.: US 12,806,782 B2
(45) Date of Patent: Nov. 24, 2026

(54) METHOD OF CONTROLLING MECHANICAL IMPEDANCE OF ROBOT, CONTROL SYSTEM AND ROBOT

(71) Applicant: ABB Schweiz AG, Baden (CH)

(72) Inventors: Pietro Falco, Västerås (SE); Jonatan Blom, Enskede (SE); Jonas Larsson, Västerås (SE)

(73) Assignee: ABB Schweiz AG, Baden (CH)

( * ) Notice: Subject to any disclaimer, the term of this patent is extended or adjusted under 35 U.S.C. 154(b) by 272 days.

(21) Appl. No.: 18/262,958

(22) PCT Filed: Feb. 4, 2021

(86) PCT No.: PCT/EP2021/052619
§ 371 (c)(1),
(2) Date: Jul. 26, 2023

(87) PCT Pub. No.: WO2022/167076
PCT Pub. Date: Aug. 11, 2022

(65) Prior Publication Data
US 2024/0083031 A1 Mar. 14, 2024

(51) Int. Cl.
*B25J 9/16* (2006.01)
*B25J 13/08* (2006.01)

(52) U.S. Cl.
CPC ............. *B25J 9/1676* (2013.01); *B25J 9/162* (2013.01); *B25J 9/1651* (2013.01); *B25J 9/1666* (2013.01); *B25J 9/1694* (2013.01); *B25J 13/089* (2013.01)

(58) Field of Classification Search
CPC ........ B25J 9/1676; B25J 19/02; B25J 11/005; G05B 2219/40202; G05B 19/4061
(Continued)

(56) References Cited

U.S. PATENT DOCUMENTS

2019/0126475 A1 5/2019 Kawanishi et al.
2019/0389065 A1 12/2019 Horiguchi et al.
(Continued)

FOREIGN PATENT DOCUMENTS

CN 111201115 A 5/2020
CN 111604897 A 9/2020
(Continued)

OTHER PUBLICATIONS

International Search Report and Written Opinion of the International Searching Authority; Application No. PCT/EP2021/052619; Completed: Oct. 21, 2021; Mailing Date: Oct. 29, 2021; 14 Pages.
(Continued)

*Primary Examiner* — Khoi H Tran
(74) *Attorney, Agent, or Firm* — Whitmyer IP Group LLC

(57) ABSTRACT

A method of controlling a robot, the method including obtaining, by means of a proximity sensor on the robot, a distance value indicative of a distance between an object and the robot; obtaining, by means of a thermal sensor on the robot, a temperature value indicative of a temperature of the object; and controlling the robot to reduce its mechanical impedance if the distance value is smaller than a distance threshold value and the temperature value is higher than a temperature threshold value. A control system for controlling a robot, and a robot including the control system, are also provided.

19 Claims, 3 Drawing Sheets

(58) Field of Classification Search
USPC .......................................................... 700/250
See application file for complete search history.

(56) References Cited

U.S. PATENT DOCUMENTS

| | | | | |
|---|---|---|---|---|
| 2020/0164516 | A1 | 5/2020 | Lehment et al. | |
| 2022/0043441 | A1 * | 2/2022 | Huang | H04L 63/123 |

FOREIGN PATENT DOCUMENTS

| | | | | |
|---|---|---|---|---|
| DE | 10324627 | A1 | 1/2005 | |
| EP | 2073084 | A1 | 6/2009 | |
| EP | 2073084 | B1 * | 2/2013 | G05B 9/02 |
| EP | 3437804 | A1 | 2/2019 | |
| JP | 02230409 | A | 9/1990 | |
| JP | 11226889 | A | 8/1999 | |
| JP | 2002144265 | A | 5/2002 | |
| KR | 101477401 | B1 | 12/2014 | |
| WO | 2018029267 | A1 | 2/2018 | |
| WO | 2018066837 | A1 | 4/2018 | |
| WO | 2020205625 | A1 | 10/2020 | |

OTHER PUBLICATIONS

International Preliminary Report on Patentability; Application No. PCT/EP2021/052619; Issued: Aug. 3, 2023; 8 Pages.

Chinese Office Action; Application No. 202180092865.3; Issued: May 21, 2025; 19 Pages.

Second Chinese Office Action; Application No. 2021800928653; Completed: Aug. 1, 2025; Mailing Date: Aug. 7, 2025; 23 Pages.

Third Chinese Office Action; Application No. 2021800928653; Completed: Dec. 2, 2025; Issued: Dec. 10, 2025; 14 Pages.

European Office Action, Communication pursuant to Article 94(3) EPC; Application No. 21 703 877.7; Issued: Mar. 6, 2026; 13 Pages.

* cited by examiner

METHOD OF CONTROLLING MECHANICAL IMPEDANCE OF ROBOT, CONTROL SYSTEM AND ROBOT

TECHNICAL FIELD

The present disclosure generally relates to control of a robot in environments where humans may be present. In particular, a method of controlling a robot, a control system for controlling a robot, and a robot comprising a control system, are provided.

BACKGROUND

Many robots are today expected to work in unstructured environments where not only inanimate moving obstacles but also humans are present. Examples of such environments are hospitals and unstructured manufacturing environments. A robot may for example be designed to share a workspace with a human for collaboration work. Humans have an excellent capability of solving imprecise exercises while a robot exhibits precision, power, and endurance.

Skepticism often exists among humans against working in close proximity to robots. For example, a human with little robot experience is likely scared if a robot makes a fast movement and then a sudden stop in immediate vicinity to the human. Although such control of the robot may have a high real safety, the perceived safety is low. It is therefore of great value to provide not only a high real safety of the robot, but also a high perceived safety. An optimal offline-planned trajectory for the robot is not sufficient to fulfill a task of both real safety and perceived safety for humans without substantially lowering productivity.

US 2019126475 A1 discloses a robot operation evaluation device including an operational state calculator for calculating an operational state of an evaluation region that is a movable region of a robot, based on an operational state of the robot; a shape-feature quantity calculator for calculating a shape-feature quantity depending on an operation direction of the evaluation region corresponding to the operational state calculated; and an evaluation value calculator for calculating an evaluation value representing a risk degree of the operational state of the evaluation region with respect to the operation direction, based on the shape-feature quantity.

Many prior art robots handle obstacles generically in that such robots react in the same way regardless of whether the obstacle is a human or an inanimate object. Many safety actions to avoid an inanimate object, such as a sudden stop, are however not appropriate for avoiding a human. Although such safety actions may provide a high real safety for the human, the perceived safety would be poor if the robot moves fast and makes a sudden stop close to the human. Conversely, many safety actions that are perceived safe by a human are unnecessary for avoiding an inanimate object since there is no perceived safety by the inanimate objects. In case a smooth and/or speed limited control of the robot, as perceived safe by a human, is applied also for inanimate objects, the efficiency of the robot becomes unnecessarily low.

SUMMARY

One object of the present disclosure is to provide a method of controlling a robot, which method improves real safety.

A further object of the present disclosure is to provide a method of controlling a robot, which method improves perceived safety.

A still further object of the present disclosure is to provide a method of controlling a robot, which method provides an efficient control of the robot.

A still further object of the present disclosure is to provide a cost-effective method of controlling a robot.

A still further object of the present disclosure is to provide a less complicated method of controlling a robot.

A still further object of the present disclosure is to provide a reliable method of controlling a robot.

A still further object of the present disclosure is to provide a method of controlling a robot, which method solves several or all of the foregoing objects in combination.

A still further object of the present disclosure is to provide a control system for controlling a robot, which control system solves one, several or all of the foregoing objects.

A still further object of the present disclosure is to provide a robot solving one, several or all of the foregoing objects.

According to one aspect, there is provided a method of controlling a robot, the method comprising obtaining, by means of a proximity sensor on the robot, a distance value indicative of a distance between an object and the robot; obtaining, by means of a thermal sensor on the robot, a temperature value indicative of a temperature of the object; and controlling the robot to reduce its mechanical impedance if the distance value is smaller than a distance threshold value and the temperature value is higher than a temperature threshold value.

By means of the thermal sensor, the robot is capable of obtaining more information regarding the nature of the object. In particular, this thermal perception enables the robot to distinguish if the object is an animate object (e.g., a human) or an inanimate object. The method therefore enables the robot to handle unexpected proximate objects in an appropriate manner. One example of an inanimate object is a mobile robot (or another mobile robot).

In case the distance value is smaller than the distance threshold value, but the temperature is lower than the temperature threshold value, e.g. if an inanimate object is in proximity to the robot, the mechanical impedance may not be reduced. The method may thus provide a different control of the mechanical impedance in dependence of the nature of the object in proximity to the robot.

The mechanical impedance is a measure of how much the robot resists motion when subjected to an external force. The mechanical impedance of a point on the robot may be defined as the ratio of the external force applied at the point to the resulting velocity at that point. The mechanical impedance may be a stiffness of the robot. Since the mechanical impedance of the robot is reduced when the robot is proximate to a human, the robot will move in a more compliant fashion, increasing both the real safety and the perceived safety of the human with a single measure. The real safety is increased since the reduced mechanical impedance makes the robot incapable of injuring the human. The perceived safety is increased since the human may touch the robot and feel the compliance of the robot when the mechanical impedance is reduced.

The temperature threshold value may be set to a value related to the body temperature of a human, e.g. to a value slightly below a normal body temperature of a human. The temperature threshold value may for example be set to 30° C. In case the temperature value is below the temperature threshold, it can be concluded that the object is not a human. Conversely, in case the temperature value is above the temperature threshold value, it can be concluded that the object is a human. In this way, the method can determine whether the object is a human or an inanimate object in a simple and reliable manner.

Alternatively, the temperature threshold value may be set in terms of probability by using a probalistic approach, e.g. based on Bayesian estimation theory. For example, the inanimate object may be considered to be a human if the probability is above 90%.

According to one variant, once it has been concluded that the object is a human, proximity of a specific body part is not considered. In this case, the mechanical impedance is reduced if any body part of the human is proximate to the robot. As a consequence, the method is made less computationally heavy and can therefore be carried out at a higher frequency, increasing the efficiency of the method.

The robot may comprise a base. The base may or may not be mobile. As an alternative to, or in addition to, a mobile base, the robot may comprise a manipulator movable relative to the base.

The robot may comprise at least one proximity sensor and at least one thermal sensor. One or more of the at least one proximity sensor may be provided on the manipulator and/or the base. One or more of the at least one thermal sensor may be provided on the manipulator and/or on the base. The manipulator may comprise a plurality of links and a plurality of joints. The manipulator may be programmable in three or more axes.

The method can be carried out with one or more low-cost proximity sensors and/or with one or more low-cost thermal sensors. The method is therefore cost-effective. Each proximity sensor may for example be a time-of-flight sensor. Each thermal sensor may for example be an infrared array sensor.

The mechanical impedance of the robot may be changed via a software control algorithm, e.g. implemented in a robot program of a control system associated with the robot.

The reduction may comprise reducing the mechanical impedance more for a smaller distance value than for a larger distance value. The larger distance value is larger than the smaller distance value. For example, the smaller distance value may be one meter, the larger distance value may be two meters and the threshold distance value may be three meters. The amount of reduction of the mechanical impedance may be determined as a function of the distance value. For example, the amount of reduction of the mechanical impedance may be inversely proportional to the distance value. Alternatively, or in addition, the mechanical impedance may be set in proportion to the distance value when the distance value is smaller than the distance threshold value and the temperature value is higher than the temperature threshold value. Thus, the shorter the distance between the robot and a human is (within the distance threshold value), the lower the stiffness of the robot is.

As an alternative, the method may comprise setting a predefined reduced mechanical impedance for the robot once the distance value is smaller than the distance threshold value and the temperature value is higher than the temperature threshold value.

The method may further comprise modifying a movement strategy of the robot if the distance value is smaller than the distance threshold value and the temperature value is higher than the temperature threshold value. The modification of the movement strategy may be performed by means of a reactive planner implemented in a control system of the robot. The reactive planner may be based on model predictive control (MPC) or a similar control. Based on the distinction between a human and an inanimate object, a suitable strategy for avoiding a collision between the robot and the object can be determined.

In case the object is not a human such that the temperature value is below the temperature threshold, a movement strategy comprising a time-optimal trajectory for the robot may be selected and a highest possible efficiency of the robot may be maintained. Alternatively, an offline-planned trajectory may be used for the robot in case the object is not a human. In case the object is a human such that the temperature value is above the temperature threshold, the movement strategy may be modified to not only include a time-optimal trajectory and a reduced mechanical impedance, but also for example an increased smoothness of movements and/or a limited speed. In this way, the robot can meet an expected social etiquette when a human is nearby. This increases the perceived safety of the robot. Thus, the method enables the movement strategy to be appropriately modified in dependence of the nature of the object.

The method may further comprise limiting a speed of the robot if the distance value is smaller than the distance threshold value and the temperature value is higher than the temperature threshold value. The limitation of the speed may form part of the modified movement strategy. The limitation of the speed increases the perceived safety. The speed may be a speed of the manipulator and/or of the base (in case of a mobile robot). In case the distance value is smaller than the distance threshold value and the temperature value is lower than the temperature threshold value, the speed of the robot may not be limited.

The method may further comprise increasing a smoothness of motion of the robot if the distance value is smaller than the distance threshold value and the temperature value is higher than the temperature threshold value. The increased smoothness of motion may form part of the modified movement strategy. The increased smoothness of motion increases the perceived safety. The smoothness of motion may be a smoothness of motion of the manipulator and/or of the base (in case of a mobile robot). The smoothness of motion may for example be increased by increasing a size of blending zones associated with points of a trajectory and/or by limiting acceleration of movable parts of the robot. In case the distance value is smaller than the distance threshold value and the temperature value is lower than the temperature threshold value, the smoothness of motion of the robot may not be limited.

In case the robot comprises a manipulator, the reduction of the mechanical impedance may comprise reducing a mechanical impedance of the manipulator. In this case, the mechanical impedance may be reduced at one, several or all joints of the manipulator.

The robot may be a mobile robot. For a mobile robot, there are typically more unexpected events to handle than for a stationary robot. The mobile robot may comprise a traction arrangement for propulsing the base, e.g. comprising a one or more driven wheels. In this case, the reduction of the mechanical impedance may comprise reducing a mechanical impedance of the traction arrangement and/or of one or more manipulators of the robot. According to one example, the reduction of the mechanical impedance comprises a full-body impedance control where the mechanical impedance for the one or more manipulators and the traction arrangement is controlled in a coordinated fashion.

Alternatively, the robot may be a stationary robot, e.g. comprising a stationary base. In any case, the robot may be a collaborative robot.

According to a further aspect, there is provided a control system for controlling a robot, the control system comprising at least one data processing device and at least one memory having a computer program stored thereon, the computer program comprising program code which, when executed by the at least one data processing device, causes the at least one data processing device to perform the steps of obtaining, from a proximity sensor on the robot, a distance value indicative of a distance between an object and the robot; obtaining, from a thermal sensor on the robot, a temperature value indicative of a temperature of the object; and controlling the robot to reduce its mechanical impedance if the distance value is smaller than a distance threshold value and the temperature value is higher than a temperature threshold value. The computer program may further comprise program code which, when executed by the at least one data processing device, causes the at least one data processing device to perform, or command performance of, various steps as described herein.

The reduction may comprise reducing the mechanical impedance more for a smaller distance value than for a larger distance value.

The computer program may comprise program code which, when executed by the at least one data processing device, causes the at least one data processing device to perform the step of modifying a movement strategy of the robot if the distance value is smaller than the distance threshold value and the temperature value is higher than the temperature threshold value.

The modification of the movement strategy may be performed by means of a reactive planner implemented in the control system.

The computer program may comprise program code which, when executed by the at least one data processing device, causes the at least one data processing device to perform the step of limiting a speed of the robot if the distance value is smaller than the distance threshold value and the temperature value is higher than the temperature threshold value.

The computer program may comprise program code which, when executed by the at least one data processing device, causes the at least one data processing device to perform the step of increasing a smoothness of motion of the robot if the distance value is smaller than the distance threshold value and the temperature value is higher than the temperature threshold value.

In case the robot comprises a manipulator, the reduction of the mechanical impedance may comprise reducing a mechanical impedance of the manipulator.

According to a further aspect, there is provided a robot comprising the control system according to the present disclosure, the proximity sensor provided on the robot, and the thermal sensor provided on the robot. The robot may be of any type as described herein. The robot may comprise one or more manipulators.

The robot may be a mobile robot.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
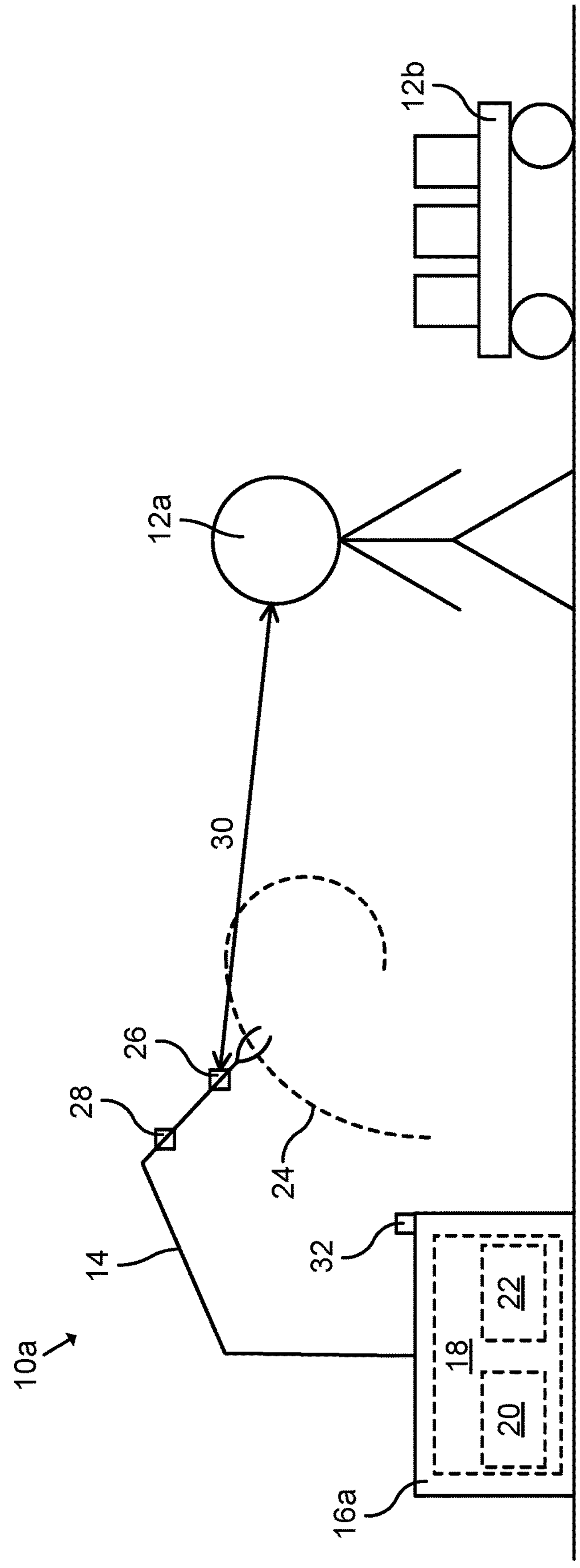
FIG. 1: schematically represents a side view of a stationary robot, a human and an inanimate object.

In the following, a method of controlling a robot, a control system for controlling a robot, and a robot comprising a control system, will be described. The same or similar reference numerals will be used to denote the same or similar structural features.

FIG. 1 schematically represents a side view of a stationary robot 10*a*, a human 12*a* and an inanimate object 12*b*. The robot 10*a* comprises a manipulator 14 and a stationary base 16*a*.

The manipulator 14 is movable relative to the base 16*a*. The manipulator 14 comprises a plurality of links and a plurality of joints. The manipulator 14 may be programmable to move in three or more axes, such as in six or seven axes. The manipulator 14 comprises a servo motor in each joint.

The robot 10*a* further comprises a control system 18. The control system 18 comprises a data processing device 20 and a memory 22. The memory 22 has a computer program stored thereon. The computer program comprises program code which, when executed by the data processing device 20 causes the data processing device 20 to perform, or command performance of, various steps as described herein. As shown in FIG. 1, the manipulator 14 executes a trajectory 24 according to a robot program implemented in the control system 18. The robot program comprises a reactive planner for controlling the robot 10*a*, e.g. based on model predictive control (MPC).

The control system 18 can control the mechanical impedance of the manipulator 14 by controlling a positional gain and a speed gain of one or more the servo motors. In this case, the positional gain corresponds to a spring constant and the speed gain corresponds to a damping factor.

The inanimate object 12*b* of this example is an automated guided vehicle, AGV, carrying items for a process involving the robot 10*a*. As shown in FIG. 1, the robot 10*a* works in an unstructured environment where both the human 12*a* and the inanimate object 12*b* may come into immediate proximity of the robot 10*a*.

The robot 10*a* further comprises one or more proximity sensors 26 and one or more thermal sensors 28. Although only one proximity sensor 26 and only one thermal sensor 28 are illustrated, the robot 10*a* may comprise a plurality of proximity sensors 26 and a plurality of thermal sensors 28, e.g. one pair of a proximity sensor 26 and a thermal sensor 28 on each link of the manipulator 14. One or more proximity sensors 26 and one or more thermal sensors 28 may also be provided on the base 16*a*.

Each proximity sensor 26 and each thermal sensor 28 is in signal communication with the control system 18. Each proximity sensor 26 outputs a distance value and each thermal sensor 28 outputs a temperature value. In this example, each proximity sensor 26 is a low-cost time-of-flight sensor and each thermal sensor 28 is a low-cost infrared array sensor.

As shown in FIG. 1, the human 12*a* is proximate to the robot 10*a*. The human 12*a* is here positioned at a distance 30 from the robot 10*a*. The proximity sensor 26 thereby provides a distance value indicative of a distance to the human 12*a* and the thermal sensor 28 thereby provides a temperature value indicative of a temperature of the human 12*a*.

The control system 18 compares the distance value with a distance threshold value. The distance threshold value may for example be 3 meters. The control system 18 further compares the temperature value with a temperature threshold value. The temperature threshold value may for example be 30° C.

In case the distance value is smaller than the distance threshold value, the control system 18 concludes that a human 12*a* or an inanimate object 12*b* is close to the robot 10*a*. In case the temperature value is larger than the temperature threshold value, the control system 18 concludes that a human 12*a*, and not an inanimate object 12*b*, is detected. Conversely, in case the temperature value is smaller than the temperature threshold value, the control system 18 concludes that an inanimate object 12*b*, and not a human 12*a*, is detected. The thermal sensors 28 thus enable a human 12*a* to be distinguished from an inanimate object 12*b*.

Even though the proximity sensors 26 and the thermal sensors 28 are low-cost sensors, the detection of a proximate human 12*a* can be made in a reliable manner. In fact, the simplicity of the proximity sensors 26 and the thermal sensors 28 makes the processing of the respective distance values and temperature values to be made quickly, e.g. at a high frequency. This further improves the reliability of the detection of an object and the categorization of the object as a human 12*a* or as an inanimate object 12*b*. Moreover, in this example the method does not react differently to different body parts of the human 12*a*. The complexity of the method can thereby be further reduced, and the reliability of the method can thereby be further increased.

The robot 10*a* may further comprise one or more vision sensors 32. Also, the one or more vision sensors 32 may be in signal communication with the control system 18. Each vision sensor 32 may for example be a stereo camera or a time-of-flight camera, such as an RGB-D camera. The vision sensors 32 may be used for long-distance monitoring to increase the reliability of the detection and categorization of the object as a human 12*a* or an inanimate object 12*b*. To this end, the temperature value output from the thermal sensors 28 and the distance value output from the proximity sensors 26 may be combined with a vision output from each of the vision sensors 32.

When no object is in the vicinity of the robot 10*a*, e.g. when the distance value to any detected object is larger than the distance threshold value, the manipulator 14 is motion controlled with a high mechanical impedance. In the motion control, the stiffness may be infinite. Should the human 12*a* get in the path of the manipulator 14 when executing the trajectory 24 during such motion control, the human 12*a* might be injured.

In case a human 12*a* is in proximity to the object, i.e. when the distance value is smaller than the distance threshold value and the temperature value is larger than the temperature threshold value, the control system 18 controls the robot 10*a* to reduce its mechanical impedance.

In this example, the mechanical impedance of the entire manipulator 14 is gradually reduced as the human 12*a* comes closer to the robot 10*a*. The mechanical impedance of the robot 10*a* is here changed via a software control algorithm of the robot program such that a stiffness of an impedance control of the manipulator 14 is reduced to successively lower the mechanical impedance of the manipulator 14. The control of the manipulator 14 may gradually or immediately change from motion control regime with high stiffness to a human-robot interaction mode with lower stiffness, such that a compliant behavior is obtained, when a human 12*a* approaches the robot 10*a*.

When the mechanical impedance is reduced, the manipulator 14 will be more compliant such that the human 12*a* cannot be injured by the manipulator 14, should the manipulator 14 contact the human 12*a*. The real safety of the human 12*a* is thereby increased. The reduced mechanical impedance of the manipulator 14 also increases the perceived safety in case the human 12*a* touches the manipulator 14 and feels its compliance.

In addition to a reduced mechanical impedance, a movement strategy by the reactive planner may optionally be different depending on whether a human 12*a* is in proximity to the robot 10*a*, or whether an inanimate object 12*b* is in proximity to the robot 10*a* or no object is in proximity to the robot 10*a*. When a human 12*a* is in proximity to the robot 10*a*, the manipulator 14 can be controlled to avoid contact with the human 12*a*, but with relatively low speeds and relatively high smoothness of motion, e.g. with limited acceleration. The manipulator 14 thereby moves slow and without jerky movements. This different behavior of the robot 10*a* further increases the perceived safety and the human 12*a* will not be scared.

When an inanimate object 12*b* is detected in proximity to the robot 10*a*, i.e. when the distance value is smaller than the distance threshold value and the temperature value is smaller than the temperature threshold value, the movement strategy of the robot 10*a* is not modified in this example. Thus, the manipulator 14 is controlled to avoid contact with the inanimate object 12*b*, but without reducing the mechanical impedance, with relatively high speeds and without imposing additional limitations on acceleration. Such movement strategies are previously known.

Figure 2:
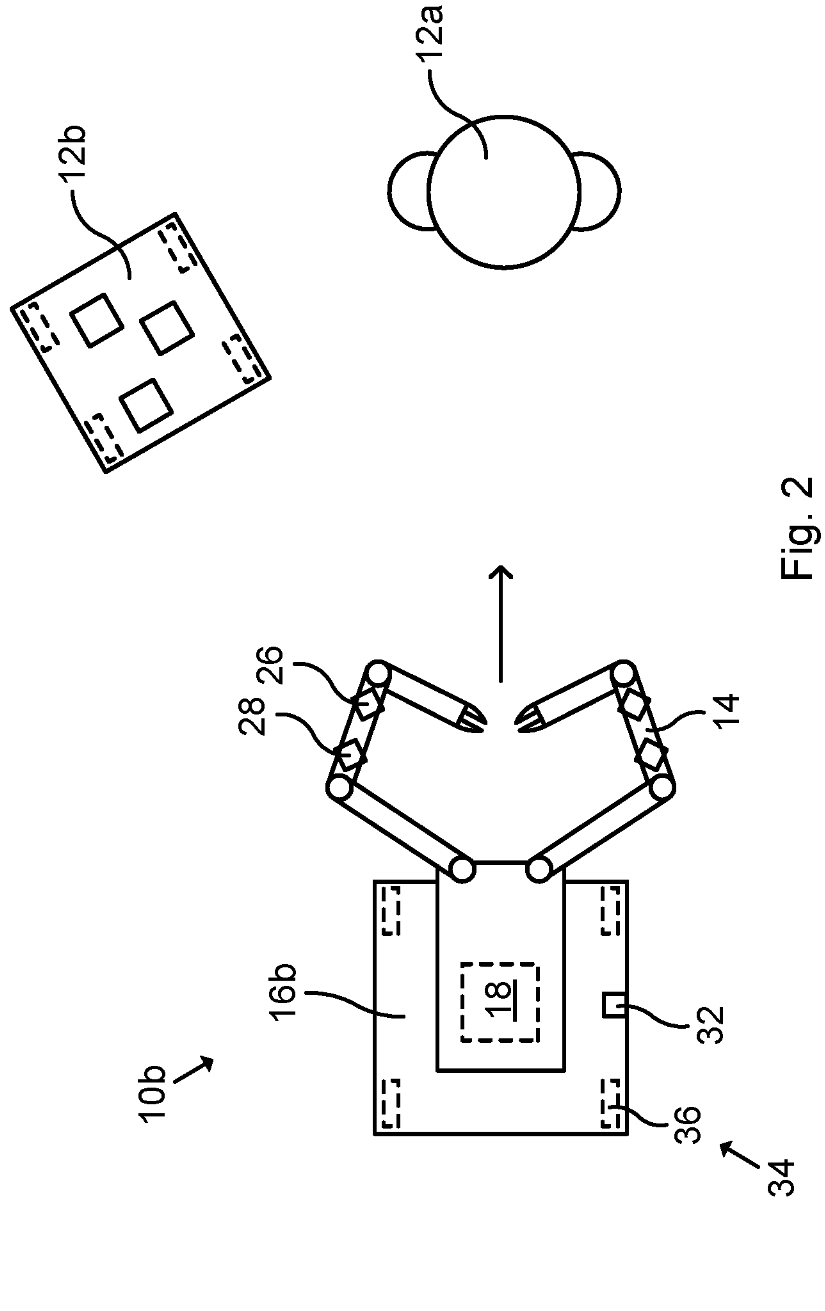
FIG. 2: schematically represents a top view of a mobile robot, a human and an inanimate object.

FIG. 2 schematically represents a top view of a mobile robot 10*b*, a human 12*a* and an inanimate object 12*b*. Mainly differences with respect to FIG. 1 will be described. The robot 10*b* comprises two manipulators 14 and may be a service robot. Each manipulator 14 is of the same or similar type as in FIG. 1. Each manipulator 14 comprises one or more proximity sensors 26 and one or more thermal sensors 28. The robot 10*b* may be referred to as a mobile manipulator.

The robot 10*b* comprises a movable base 16*b* having a traction arrangement 34. The base 16*b* may be an automated guided vehicle, AGV. The traction arrangement 34 is configured to drive the robot 10*b* over a surface, such as a floor. The traction arrangement 34 of this example comprises a plurality of driven wheels 36. A servo motor is provided for each driven wheel 36. The mechanical impedance of the traction arrangement 34 can be controlled by controlling a positional gain and a speed gain of one or more the servo motors for the driven wheels 36. In this case, the positional gain corresponds to a spring constant and the speed gain corresponds to a damping factor.

The manipulators 14 of the robot 10*b* are controlled in the same way as the manipulator 14 of the robot 10*a* when a human 12*a* is in proximity to the robot 10*b*, when an inanimate object 12*b* is in proximity to the robot 10*b* and when no object is in proximity to the robot 10*b*. Thus, the mechanical impedance of the manipulators 14 are reduced when a human 12*a* is in proximity to the robot 10*b*. However, in case a human 12*a* comes into proximity of the robot 10*b*, also the mechanical impedance of the traction arrangement 34 is reduced. The mechanical impedance of the entire robot 10*b* is thereby reduced. In case the manipulators 14 are stationary with respect to the base 16*b* when the base 16*b* moves, the human 12*a* can feel the resiliency of the traction arrangement 34 if contacting the robot 10*b*.

When a human 12*a* is in proximity to the robot 10*b*, also the traction arrangement 34 can be controlled in order to avoid contact between the robot 10*b* and the human 12*a*, but with relatively low speeds and relatively high smoothness of motion, e.g. with limited acceleration. Also, the base 16*b* thereby moves slow and without jerky movements. This different behavior of the traction arrangement 34 further increases the perceived safety and the human 12*a* will not be scared.

When an inanimate object 12*b* is detected in proximity to the robot 10*b*, i.e. when the distance value is smaller than the distance threshold value and the temperature value is smaller than the temperature threshold value, the movement strategy of the manipulators 14 and the traction arrangement 34 is not modified. Thus, the robot 10*b* is controlled to avoid contact with the inanimate object 12*b*, but without reducing its mechanical impedance, with relatively high speeds and without imposing additional limitations on acceleration.

Figure 3:
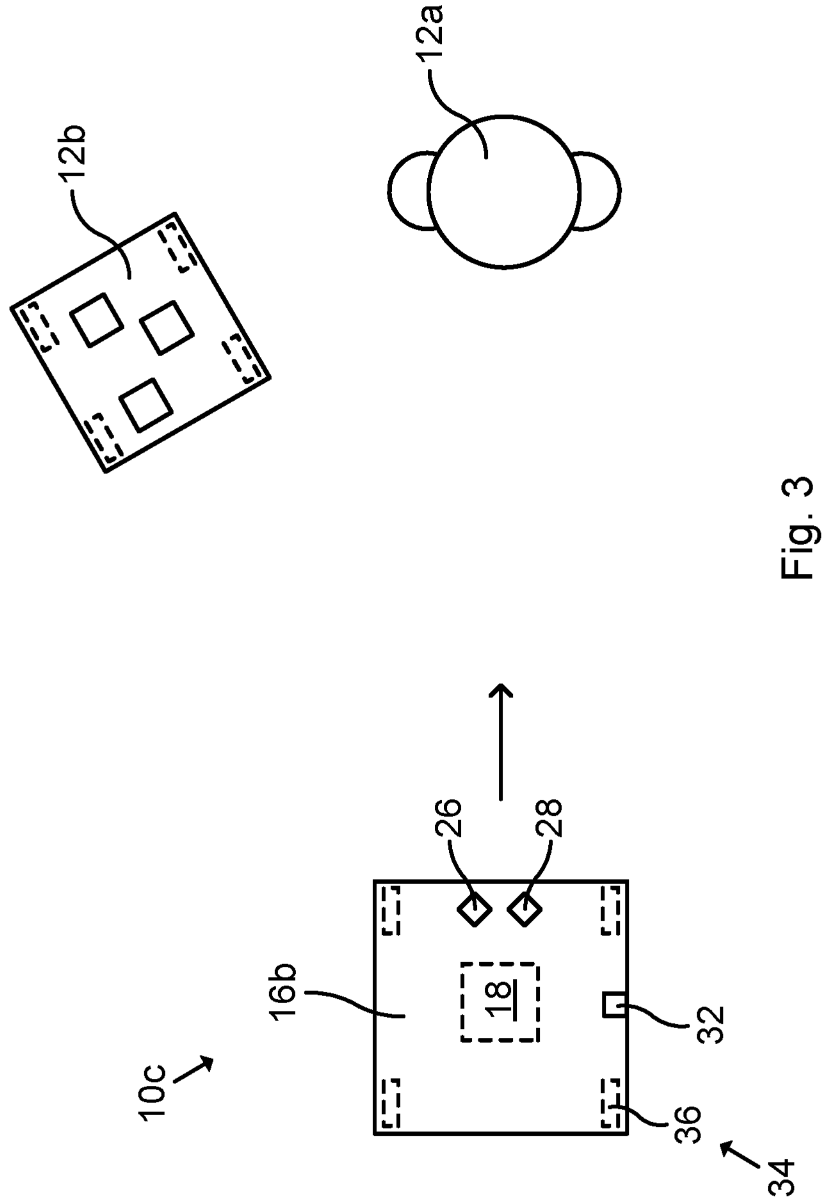
FIG. 3: schematically represents a top view of a further mobile robot, a human and an inanimate object.

FIG. 3 schematically represents a top view of a further mobile robot 10*c*, a human 12*a* and an inanimate object 12*b*. Mainly differences with respect to FIG. 2 will be described. The robot 10*c* in FIG. 3 differs from the robot 10*b* in FIG. 2 in that the robot 10*c* in FIG. 3 does not comprise any manipulator. When the mechanical impedance of the robot 10*c* is reduced, the mechanical impedance of the traction arrangement 34 is reduced.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of controlling a robot, the method comprising:
- obtaining, by a proximity sensor on the robot, a distance value indicative of a distance between an object and the robot;
- obtaining, by a thermal sensor on the robot, a temperature value indicative of a temperature of the object; and
- controlling the robot to reduce its mechanical impedance if the distance value is smaller than a distance threshold value and the temperature value is higher than a temperature threshold value, wherein the mechanical impedance of the robot is not reduced if the distance value is smaller than the distance threshold value and the temperature value is lower than the temperature threshold value.

2. The method according to claim 1, wherein the reduction comprises reducing the mechanical impedance more for a smaller distance value than for a larger distance value.

3. The method according to claim 1, further comprising modifying a movement strategy of the robot if the distance value is smaller than the distance threshold value and the temperature value is higher than the temperature threshold value.

4. The method according to claim 1, further comprising limiting a speed of the robot if the distance value is smaller than the distance threshold value and the temperature value is higher than the temperature threshold value.

5. The method according to claim 1, further comprising increasing a smoothness of motion of the robot if the distance value is smaller than the distance threshold value and the temperature value is higher than the temperature threshold value.

6. The method according to claim 1, wherein the robot comprises a manipulator, and wherein the reduction of the mechanical impedance includes reducing a mechanical impedance of the manipulator.

7. The method according to claim 1, wherein the robot is a mobile robot.

8. A control system for controlling a robot, the control system comprising at least one data processing device and at least one memory having a computer program stored thereon, the computer program including a program code which, when executed by the at least one data processing device, causes the at least one data processing device to perform the steps of:
- obtaining, from a proximity sensor on the robot, a distance value indicative of a distance between an object and the robot;
- obtaining, from a thermal sensor on the robot, a temperature value indicative of a temperature of the object; and
- controlling the robot to reduce its mechanical impedance if the distance value is smaller than a distance threshold value and the temperature value is higher than a temperature threshold value, wherein the mechanical impedance of the robot is not reduced if the distance value is smaller than the distance threshold value and the temperature value is lower than the temperature threshold value.

9. The control system according to claim 8, wherein the reduction comprises reducing the mechanical impedance more for a smaller distance value than for a larger distance value.

10. The control system according to claim 8, wherein the computer program comprises program code which, when executed by the at least one data processing device, causes the at least one data processing device to perform the step of:
- modifying a movement strategy of the robot if the distance value is smaller than the distance threshold value and the temperature value is higher than the temperature threshold value.

11. The control system according to claim 8, wherein the computer program comprises program code which, when executed by the at least one data processing device, causes the at least one data processing device to perform the step of:
- limiting a speed of the robot if the distance value is smaller than the distance threshold value and the temperature value is higher than the temperature threshold value.

12. The control system according to claim 8, wherein the computer program comprises program code which, when executed by the at least one data processing device, causes the at least one data processing device to perform the step of:
- increasing a smoothness of motion of the robot if the distance value is smaller than the distance threshold value and the temperature value is higher than the temperature threshold value.

13. The control system according to claim 8, wherein the reduction of the mechanical impedance includes reducing a mechanical impedance of a manipulator of the robot.

14. A robot comprising:
- a control system including at least one data processing device and at least one memory having a computer program stored thereon, the computer program including a program code which, when executed by the at least one data processing device, causes the at least one data processing device to perform the steps of:
  - obtaining, from a proximity sensor on the robot, a distance value indicative of a distance between an object and the robot;

obtaining, from a thermal sensor on the robot, a temperature value indicative of a temperature of the object; and controlling the robot to reduce its mechanical impedance if the distance value is smaller than a distance threshold value and the temperature value is higher than a temperature threshold value, wherein the mechanical impedance of the robot is not reduced if the distance value is smaller than the distance threshold value and the temperature value is lower than the temperature threshold value, and the proximity sensor provided on the robot, and the thermal sensor provided on the robot.

15. The robot according to claim 14, wherein the robot is a mobile robot.

16. The method according to claim 2, further comprising modifying a movement strategy of the robot if the distance value is smaller than the distance threshold value and the temperature value is higher than the temperature threshold value.

17. The method according to claim 2, further comprising limiting a speed of the robot if the distance value is smaller than the distance threshold value and the temperature value is higher than the temperature threshold value.

18. The method according to claim 2, further comprising increasing a smoothness of motion of the robot if the distance value is smaller than the distance threshold value and the temperature value is higher than the temperature threshold value.

19. The method according to claim 2, wherein the robot comprises a manipulator, and wherein the reduction of the mechanical impedance includes reducing a mechanical impedance of the manipulator.

* * * * *